US011288270B2

(12) United States Patent
Ruiz et al.

(10) Patent No.: US 11,288,270 B2
(45) Date of Patent: Mar. 29, 2022

(54) APPARATUS, SYSTEM, AND METHOD FOR CROSS-PLATFORM DATA PROCESSING

(71) Applicants: Qatar Foundation for Education, Science and Community Development, Doha (QA); Hasso-Plattner-Institut fur Digital Engineering gGmbH, Potsdam (DE)

(72) Inventors: Jorge Arnulfo Quiane Ruiz, Doha (QA); Sebastian Kruse, Potsdam (DE); Zoi Kaoudi, Doha (QA); Sanjay Chawla, Doha (QA); Bertty Contreras, Doha (QA); Felix Naumann, Doha (QA)

(73) Assignees: QATAR FOUNDATION FOR EDUCATION, SCIENCE AND COMMUNITY DEVELOPMENT, Doha (QA); HASSO PLATTNER INSTITUTE, Potsdam (DE)

( * ) Notice: Subject to any disclaimer, the term of this patent is extended or adjusted under 35 U.S.C. 154(b) by 196 days.

(21) Appl. No.: 16/407,604

(22) Filed: May 9, 2019

(65) Prior Publication Data

US 2019/0347261 A1    Nov. 14, 2019

Related U.S. Application Data

(60) Provisional application No. 62/670,259, filed on May 11, 2018.

(51) Int. Cl.
*G06F 16/245* (2019.01)
*G06F 16/2453* (2019.01)

(52) U.S. Cl.
CPC .. *G06F 16/24545* (2019.01); *G06F 16/24537* (2019.01)

(58) Field of Classification Search
CPC ........ G06F 16/24542; G06F 16/24554; G06F 16/24553; G06F 16/2454; G06F 16/24539; G06F 16/24545; G06F 16/24537

(Continued)

(56) References Cited

U.S. PATENT DOCUMENTS 8,126,873 B2 *  2/2012  Downer ............ G06F 16/24542
                                                          707/720
8,595,215 B2 * 11/2013  Hattori ................ G06F 16/8365
                                                          707/716

(Continued)

OTHER PUBLICATIONS

Kruse et al. RHEEMIx in the Data Jungle a Cross-Platform Query Optimizer, Publish VLDB, doc id 1805.03533v1, pp. 1-16.*

*Primary Examiner* — Baoquoc N To
(74) *Attorney, Agent, or Firm* — K&L Gates LLP

(57) ABSTRACT

The present disclosure generally relates to a cost-based optimizer for efficiently processing data through the use of multiple different data processing platforms. The cost-based optimizer may receive an input plan for processing data that includes a number of base operators. The cost-based optimizer may then determine execution operators for each base operator, where each execution operator corresponds to a different data processing platform. From the execution operators, the cost-based optimizer may determine possible subplans for executing the input plan on one or more data processing platforms. The cost-based optimizer may determine the cost of executing each possible subplan and choose the subplan with the lowest cost.

22 Claims, 15 Drawing Sheets

(58) Field of Classification Search
USPC .......................................... 707/716, 718, 719
See application file for complete search history.

(56) References Cited

U.S. PATENT DOCUMENTS

| | | | |
|---|---|---|---|
| 9,229,979 B2* | 1/2016 | Shankar | G06F 16/24532 |
| 9,720,967 B2* | 8/2017 | Lee | G06F 16/24544 |
| 2014/0114952 A1* | 4/2014 | Robinson | G06F 16/24532 |
| | | | 707/718 |
| 2014/0317085 A1* | 10/2014 | Wehrmeister | G06F 16/24544 |
| | | | 707/714 |

* cited by examiner

Algorithm 1: Minimum conversion tree search.

Input: conversion graph $G$, root channel $c_r$, target channel sets $\mathscr{C}_t$
Output: minimum conversion tree 1. $\mathscr{C}_t \leftarrow \text{kernelize}(\mathscr{C}_t)$;
2. $T_{c_r} \leftarrow \text{traverse}(G, c_r, \mathscr{C}_t, \emptyset, \emptyset)$;
3. return $T_{c_r}[\mathscr{C}_t]$;

▷ Recursive traversal
Input: channel conversion graph $G$, current channel $c$, target channel sets $\mathscr{C}_t$, visited channels $C_v$, satisfied target channel sets $\mathscr{C}_s$
Output: minimum conversion trees from $c$ to subsets of $\mathscr{C}_t$ 4. Function traverse($G, c, \mathscr{C}_t, C_v, \mathscr{C}_s$)
5.     $T \leftarrow \text{create-dictionary}()$;
6.     $\mathscr{C}'_s \leftarrow \{C_{t_i} \in \mathscr{C}_t \mid c \in C_{t_i}\} \setminus \mathscr{C}_s$;
7.     if $\mathscr{C}'_s \neq \emptyset$ then
8.        foreach $\mathscr{C}''_s \in 2^{\mathscr{C}'_s} \setminus \emptyset$ do $T[\mathscr{C}''_s] \leftarrow \text{tree}(c)$;
9.        if $\mathscr{C}_s \cup \mathscr{C}'_s = \mathscr{C}_t$ then return $T$;
10.     $C_v \leftarrow C_v \cup \{c\}$;
11.     if reusable($c$) then $\mathscr{C}_s \leftarrow \mathscr{C}_s \cup \mathscr{C}'_s$;
12.     $\mathcal{T} \leftarrow \emptyset$;
13.     foreach $(c \xrightarrow{o} c') \in G$ with $c' \notin C_v$ do
14.        $T' \leftarrow \text{traverse}(G, c', \mathscr{C}_t, C_v, \mathscr{C}_s)$;
15.        $T' \leftarrow \text{grow}(T', c \xrightarrow{o} c')$;
16.        $\mathcal{T} \leftarrow \mathcal{T} \cup \{T'\}$;
17.     if reusable($c$) then $d \leftarrow |\mathscr{C}_t| - |\mathscr{C}_s|$ else $d \leftarrow 1$;
18.     foreach $\mathbf{T} \in \text{disjoint-combinations}(\mathcal{T}, d)$ do
19.        $T \leftarrow \text{merge-and-update}(\mathbf{T}, T)$;
20.     return $T$;

Input: System 104 inflated plan $R$
Output: Optimal execution plan $sp_{min}$

1    $\mathcal{E} \leftarrow \{((o), SP_o) : o$ is an inflated operator $\in R\}$ ;
2    $joinGroups \leftarrow$ find-join-groups($\mathcal{E}$) ;
3    $queue \leftarrow$ create-priority-queue($joinGroups$) ;
4    while $|queue| > 0$ do
5       $joinGroup = \{E_{out}, E_{in}^1, E_{in}^2, \ldots\} \leftarrow$ poll($queue$) ;
6       $E_{\bowtie} \leftarrow \sigma(E_{out} \bowtie E_{in}^1 \bowtie E_{in}^2 \bowtie \ldots)$ ;
7       foreach $joinGroup' \in queue$ do
8           if $joinGroup \cap joinGroup' \neq \emptyset$ then
9              update($joinGroup'$ with $E_{\bowtie}$) ;
10             re-order($joinGroup$ in $queue$) ;

11   $sp_{min} \leftarrow$ the subplan in $E_{\bowtie}$ with the lowest cost ;

Fig. 9

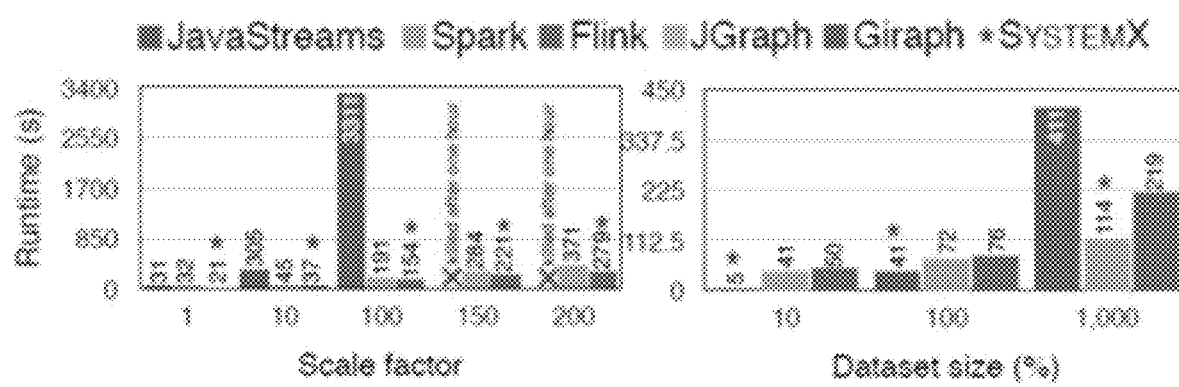
Fig. 10E
Fig. 10F
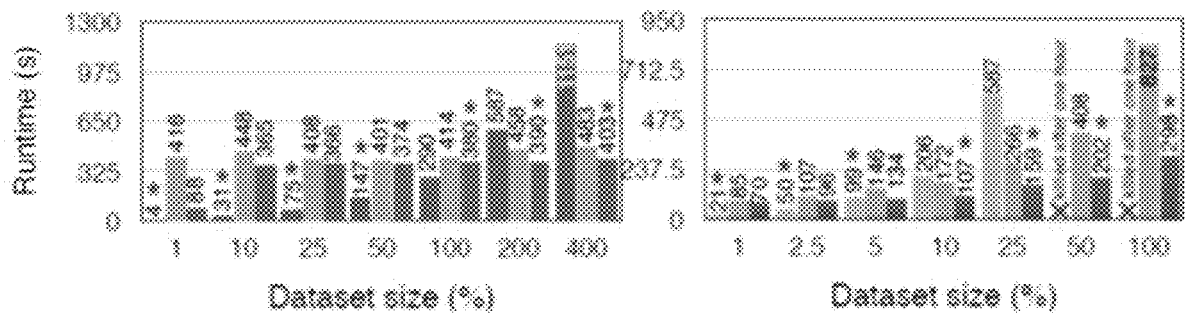
Fig. 10G
Fig. 10H

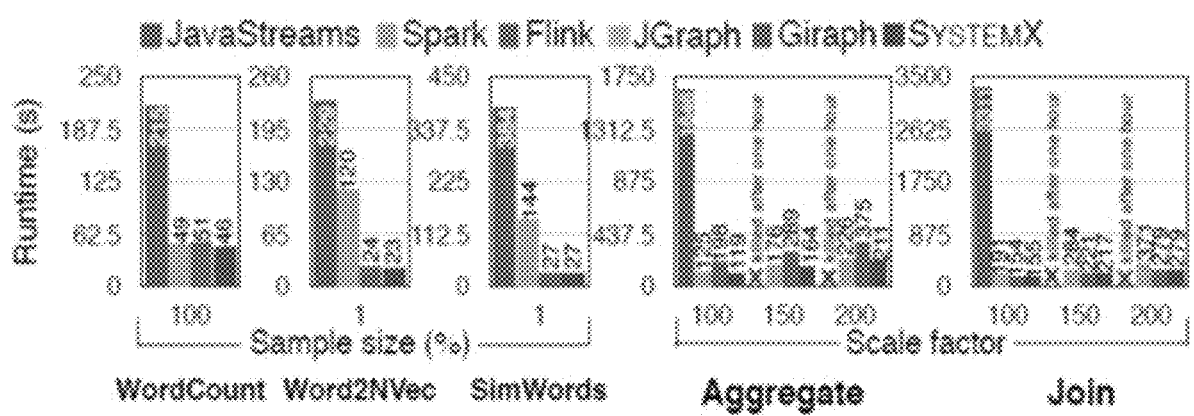
Fig. 11A                    Fig. 11B

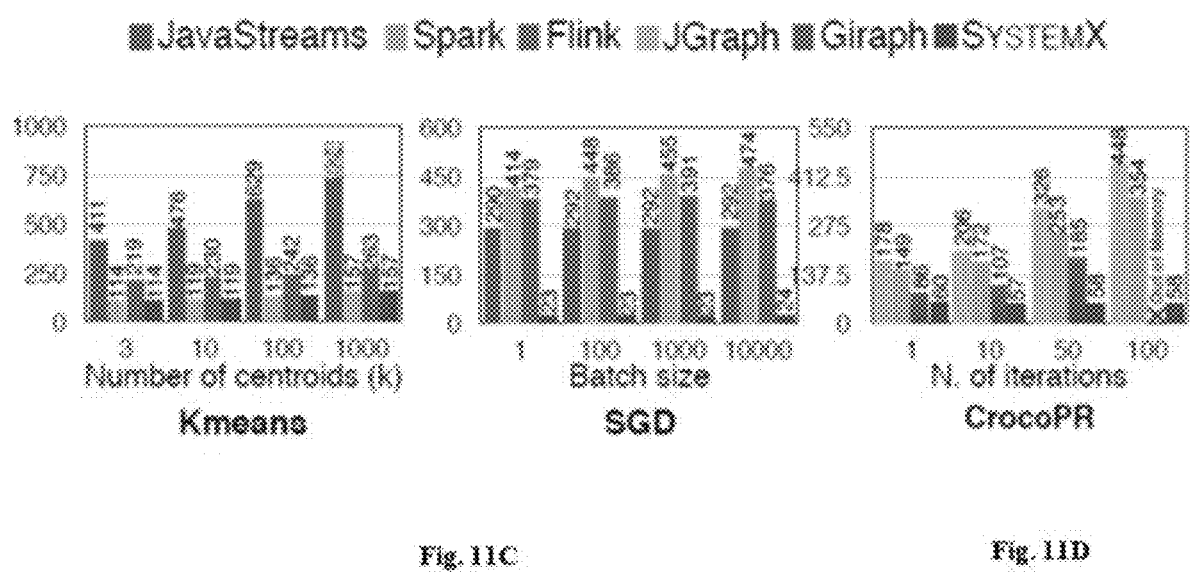

APPARATUS, SYSTEM, AND METHOD FOR CROSS-PLATFORM DATA PROCESSING

PRIORITY CLAIM

The present application claims priority to and the benefit of U.S. Provisional Patent Application No. 62/670,259 filed on May 11, 2018, the entirety of which is incorporated herein by reference.

BACKGROUND

Companies and organizations are continually collecting many diverse datasets for an ever-increasing number of data analytics, which are often complex. To perform these data analytics on its datasets, companies and organizations will utilize one or more data processing platforms. In response to a growing number of diverse datasets, the notion of "one size does not fit all" has led to the proliferation of many different specialized data processing platforms. While specialized data processing platforms can excel at different kinds of analytics, combining multiple platforms can enhance functionality and improve performance of a company's or organization's data processing procedures. However, one major challenge to processing a company's or organization's diverse datasets using multiple platforms is that datasets may reside on multiple platforms in multiple formats, which results in highly complex data query and processing tasks.

Current approaches to cope with cross-platform analytics often rely on ad-hoc programming to connect the platforms; however, these methods are often expensive, inflexible, error-prone, and inefficient. The ad-hoc programming method also requires having knowledge of all the intricacies of each platform to achieve the required efficiency.

SUMMARY

The present disclosure generally relates to a cost-based optimizer for efficiently processing data through the use of multiple different data processing platforms. The present disclosure provides an improved apparatus, system, and method for cross-platform data processing that generates possible execution plans for processing datasets across multiple platforms (e.g., executing a data analytic task) and selects the execution plan with the lowest cost. Deriving a cost-based optimizer for cross-platform settings presents a number of problems. The number of possible execution plans grows exponentially with the number of operations in a given data analytic task. The optimizer must not only consider the cost of executing the data analytic task, but also the cost of moving data across platforms. The data movement across platforms may be complex and thus may require proper planning and optimization itself. Data processing platforms also vastly differ with respect to their supported operations and processing abstractions. And, the optimizer must be able to accommodate new data processing platforms and emerging application requirements. The present technology, in various embodiments, addresses these problems.

In one embodiment, a cross-platform data processing apparatus includes a processor and a memory storing instructions which, when executed by the processor, cause the processor to receive an input plan to process a set of data, the input plan having a number of base operators. The instructions may then cause the processor to determine a first execution operator for a first base operator from the number of base operators. The first execution operator corresponds to a first data processing platform. The processor may then determine a second execution operator for the first base operator. The second execution operator corresponds to a second data processing platform. The processor may then generate a first subplan based on the first execution operator and a second subplan based on the second execution operator. The instructions may then cause the processor to calculate a cost value for each of the first subplan and the second subplan. The processor may then select the subplan that has the lowest cost value between the first subplan and the second subplan.

In one embodiment, a method for efficient cross-platform data processing includes receiving an input plan to process a set of data, the input plan having a number of base operators. The method may then include determining a first execution operator and a second execution operator for a first base operator from the number of base operators. The first execution operator corresponds to a first data processing platform and the second execution operator corresponds to a second data processing platform. The method may then include generating a first subplan based on the first execution operator and a second subplan based on the second execution operator. The method may then include calculating a cost value for each of the first subplan and the second subplan. The method may then include selecting the subplan that has the lowest cost value between the first subplan and the second subplan.

In one embodiment, a non-transitory, computer-readable medium stores instructions which, when executed by a processor, cause the processor to receive an input plan to process a set of data, the input plan having a number of base operators. The instructions may then cause the processor to determine a first execution operator for a first base operator from the number of base operators. The first execution operator corresponds to a first data processing platform. The processor may then determine a second execution operator for the first base operator. The second execution operator corresponds to a second data processing platform. The processor may then generate a first subplan based on the first execution operator and a second subplan based on the second execution operator. The instructions may then cause the processor to calculate a cost value for each of the first subplan and the second subplan. The processor may then select the subplan that has the lowest cost value between the first subplan and the second subplan.

BRIEF DESCRIPTION OF THE FIGURES

FIG. 8 illustrates an example embodiment of an algorithm to solve a minimum conversion tree problem of the present disclosure.

FIG. 9 illustrates an example embodiment of an algorithm to enumerate possible subplans from an inflated plan and select the subplan with the lowest cost value of the present disclosure.

FIGS. 10A-10H illustrate example graphical representations demonstrating how the presently disclosed optimizer selected a single data processing platform to execute a given task.

FIGS. 11A-11D illustrate example graphical representations demonstrating the efficiency of the presently disclosed optimizer when using multiple platforms for a task.

DETAILED DESCRIPTION

Figure 1A:
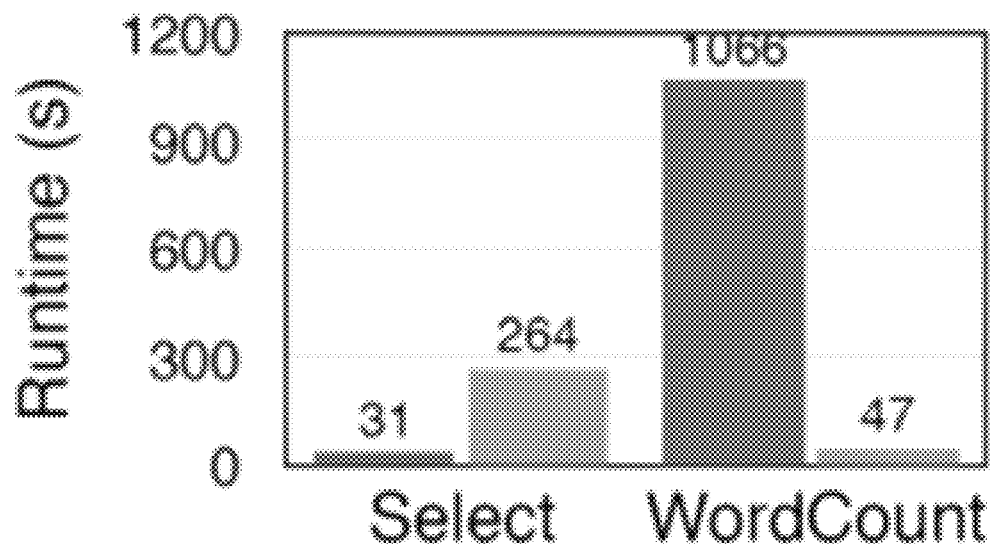
FIGS. 1A and 1B illustrate example graphical representations of data demonstrating that performance varies between data processing platforms and that combining platforms can improve performance over a single platform.
Figure 1B:
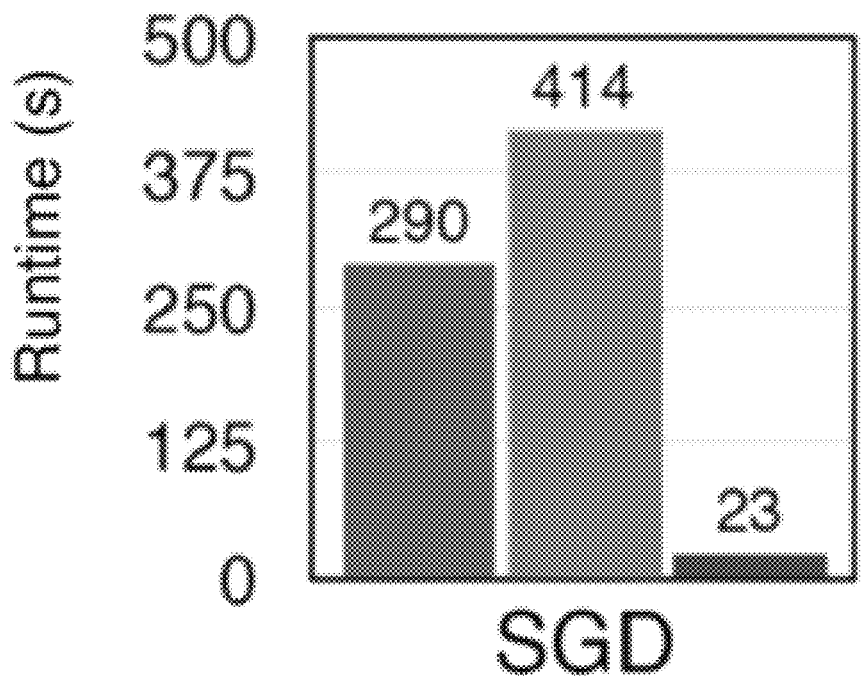

The present disclosure relates in general to a cost-based optimizer for efficiently processing data though the use of multiple different data processing platforms. Companies and organizations continue to collect a diverse array of datasets and execute ever-increasingly complex analytics on the datasets. In a growing number of instances, processing these datasets requires using more than one data processing platform (hereinafter, "platform" or "platforms"). For example, depending on the input datasets and parametrization, some applications perform best on different platforms and thus multiple platforms are needed to run multiple applications. FIG. 1A illustrates that the runtime varies between the Postgres platform and the Spark platform to run a SELECT task and a WordCount task respectively. The Postgres platform is faster for the SELECT task and the Spark platform is faster for the WordCount task. In another example, while certain specialized platforms may excel at a specific task, the use of multiple platforms may enhance functionality and improve performance. FIG. 1B illustrates that the runtime to train a logistic regression model using the stochastic gradient descent algorithm for the JavaStreams platform individually and the Spark platform individually was much longer than the runtime when the JavaStreams and Spark platforms were combined. In another example still, some applications benefit from using multiple platforms throughout a single task.

In addition to the above examples, in some instances datasets reside on different data processing platforms that have different operating functions. Thus, an application may require using multiple platforms because the input data is stored on multiple data stores. For example, one company may need to process 50 diverse datasets, which are on a dozen different internal systems. In another example, some applications may require using multiple platforms because the platform where the data resides (e.g., PostgreSQL) cannot perform the incoming task (e.g., a machine learning task).

Current practices to cope with cross-platform requirements are expensive and error-prone. Consequently, there exists a need for a way to find the set of platforms that minimizes the total execution cost of a given task. Deriving a cost-based optimizer for cross-platform processing, however, presents a number of problems. The number of possible execution plans grows exponentially with the number of operations in a given data analytic task. The optimizer must not only consider the cost of executing the data analytic task, but also the cost of moving data across platforms. The data movement across platforms may be complex and thus may require proper planning and optimization itself. Data processing platforms also vastly differ with respect to their supported operations and processing abstractions. And, the optimizer must be able to accommodate new data processing platforms and emerging application requirements.

Reference is made herein to platforms. As disclosed herein, platforms may refer to any system or software that collects and manages data. It should be understood that a dataset may refer to any collection of data or subset of a collection of data. Reference is also made herein to tasks which may refer to any specific and specialized sequence of operators to collect, manipulate, organize, or send data, or any other function with regard to data. Operators may refer to a single function performed on data. Reference is also made herein to plans which may refer to any arrangement of operators through which data flows during a given data analytic task.

Figure 2:
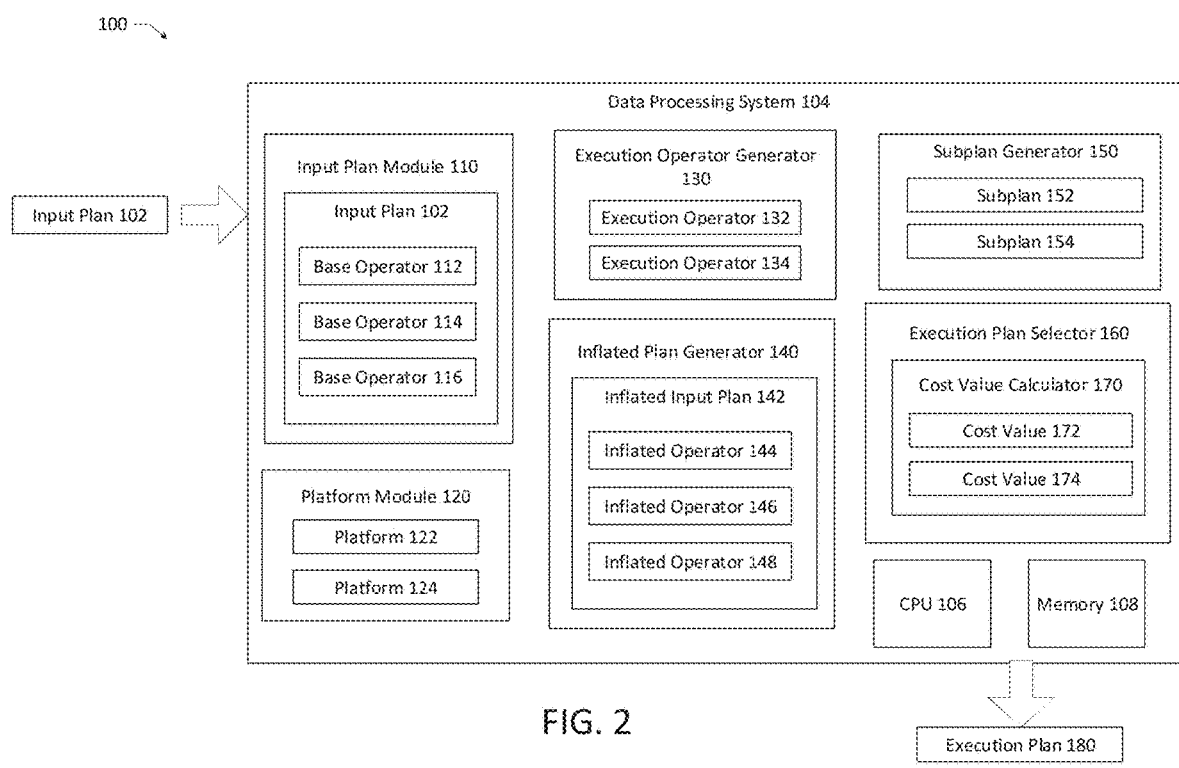
FIG. 2 illustrates an example embodiment of a system of the present disclosure.

FIG. 2 illustrates an embodiment of the system 100 that provides for cost-efficient cross-platform data processing, according to an example embodiment of the present disclosure. A data processing system 104 may receive an input plan 102 for processing a dataset and generate an execution plan 180 for that input plan 102, according to an embodiment. The data processing system 104 includes different components that are representative of computational processes, routines, and/or algorithms. In some embodiments, the computational processes, routines, and/or algorithms may be specified in one or more instructions stored on a computer readable medium that, when executed by a processor of the data processing system 104, cause the data processing system 104 to perform the operations discussed below. For example, all or part of the computational processes, routines, and/or algorithms may be implemented by the CPU 106 and the memory 108. It should be appreciated that in other embodiments the components of the data processing system 104 may be combined, rearranged, removed, or provided on a separate device or server.

Applications may issue tasks to the example data processing system 104, which then dynamically executes the tasks on the platforms the data processing system 104 deems to be the most suitable. For example, the example data processing system 104 may receive from an application an input plan 102 including a sequence of any number of base operators 112, 114, 116 for processing a dataset. The data processing system 104 may store the input plan 102 and its base operators 112, 114, 116 in an input plan module 110. The example data processing system 104 may also include a platform module 120 that stores information on any number of available platforms 122, 124 that may be utilized for data processing. It should be understood that the present disclosure may be used with any suitable platform. It should also be appreciated that in various embodiments, the data processing system 104 does not store information on platforms 122, 124 and instead accesses such information over a network. Example platforms may include the Spark, JavaStreams, PSQL, Flink, GraphX, Giraph, JGraph, Postgres, and PostgreSQL platforms, among other data processing platforms. The example data processing system 104 may also include an execution operator generator 130 which generates execution operators 132, 134 that correspond to a base operator 112, 114, 116 based on the possible platforms 122, 124, the process of which will be described in more detail below.

The example data processing system 104 may also include an inflated plan generator 140 which generates an inflated input plan 142 based on inflated operators 144, 146, 148 that include the base operators 112, 114, 116 and generated corresponding execution operators 132, 134 of the input plan 102. The example data processing system 104 may also include a subplan generator 150 which generates any number of subplans 152, 154 according to the inflated input plan 142, the process of which will also be described in more detail below. The example data processing system 104 may also include an execution plan selector 160 which may include a cost value calculator 170. In various embodiments, the cost value calculator 170 may calculate a cost value 172, 174, 176 for each of the generated subplans 152, 154. In various embodiments, the execution plan selector 160 may then select an execution plan 180 which may be the subplan 152, 154 corresponding to the lowest cost value 172, 174, 176.

Figure 3:
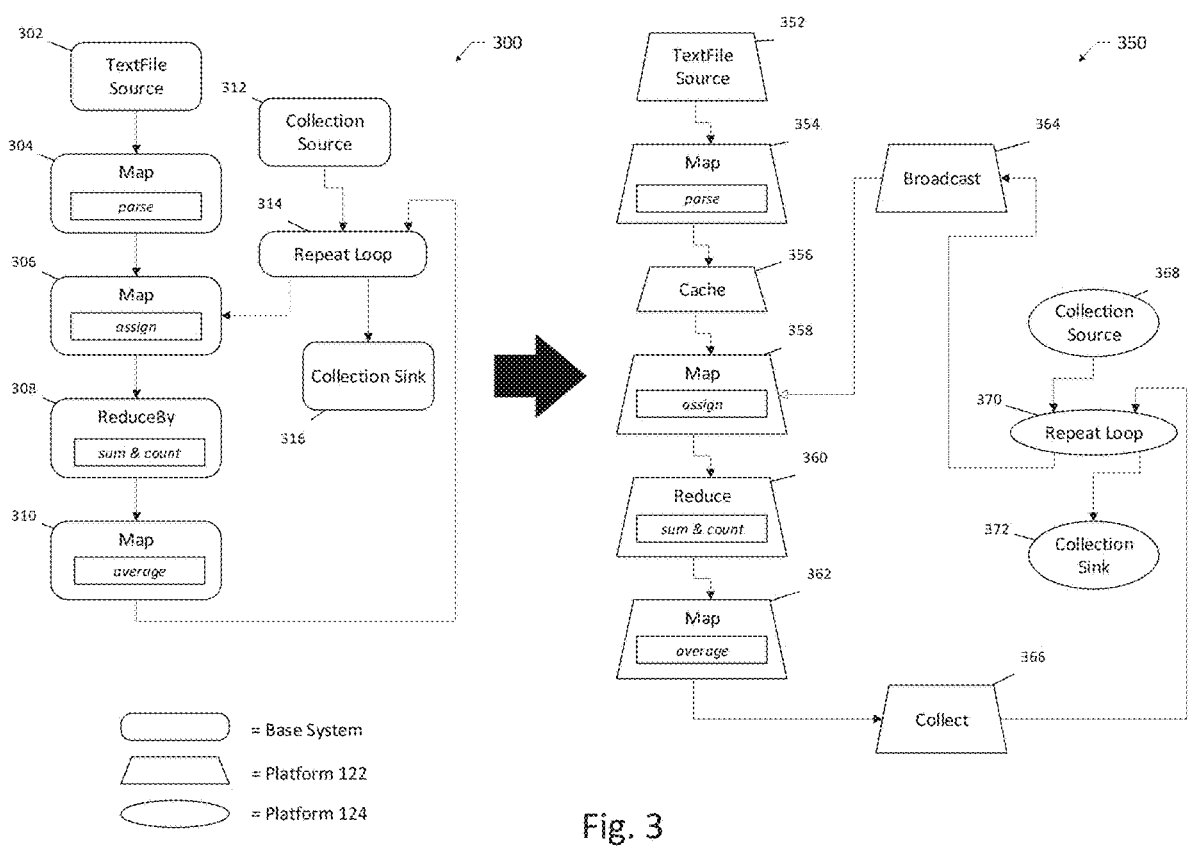
FIG. 3 illustrates an example embodiment of an input plan transformed into an execution plan of the present disclosure.

FIG. 3 illustrates a mapped graph of an example input plan 300 including base operators 302-316. The example input plan 300 includes reading data points via a "TextFileSource" (i.e., the base operator 302) and parsing the data points using a "Map" (i.e., the base operator 304) while initial centroids are read via a "CollectionSource" (i.e., the base operator 312). The main operations of the example input plan 300 (i.e., assigning the closest centroid to each data point and computing the new centroids) may be repeated until convergence (i.e., the termination condition of the base operator 314, "RepeatLoop"). The resulting centroids may then be output in a collection (i.e., base operator 316). As illustrated in FIG. 3, the operators in the shape of rounded rectangles correspond to operators in the base system, for example, the data processing system 104. The operators in the shape of trapezoids correspond to operators of a first platform, for example, the platform 122. The operators in the shape of ellipses correspond to operators of a second platform that is different than the first platform, for example, the platform 124. The solid lines indicate data flow between operations and the dashed lines indicate broadcast data flow between operators. The text in rectangles within each operator corresponds to a user defined function (e.g., "parse," "assign," "sum & count," and "average").

FIG. 3 also illustrates an example execution plan 350 for the input plan 300 including execution operators 352-372. The execution operators 352-366 are specific to the platform 122 and the execution operators 368-372 are specific to the platform 124. In some embodiments, such as the example execution plan 350, an execution plan 180 may include additional execution operators 132, 134 beyond the base operators 112, 114, 116 of the input plan 102 for data movement among platforms (e.g., the "Broadcast" execution operator 364). It should be appreciated that the illustrated base operators 302-316 and execution operators 352-372 are only examples and the present technology may be used with any suitable base operator 112, 114, 116 or execution operator 122, 124 for data processing. It should also be appreciated that the order of base operators 302-316 and execution operators 352-372 is only an example and the present technology may be used with any suitable input plan 102 or execution plan 180 including any order of base operators 112, 114, 116 or execution operators 122, 124.

Figure 4:
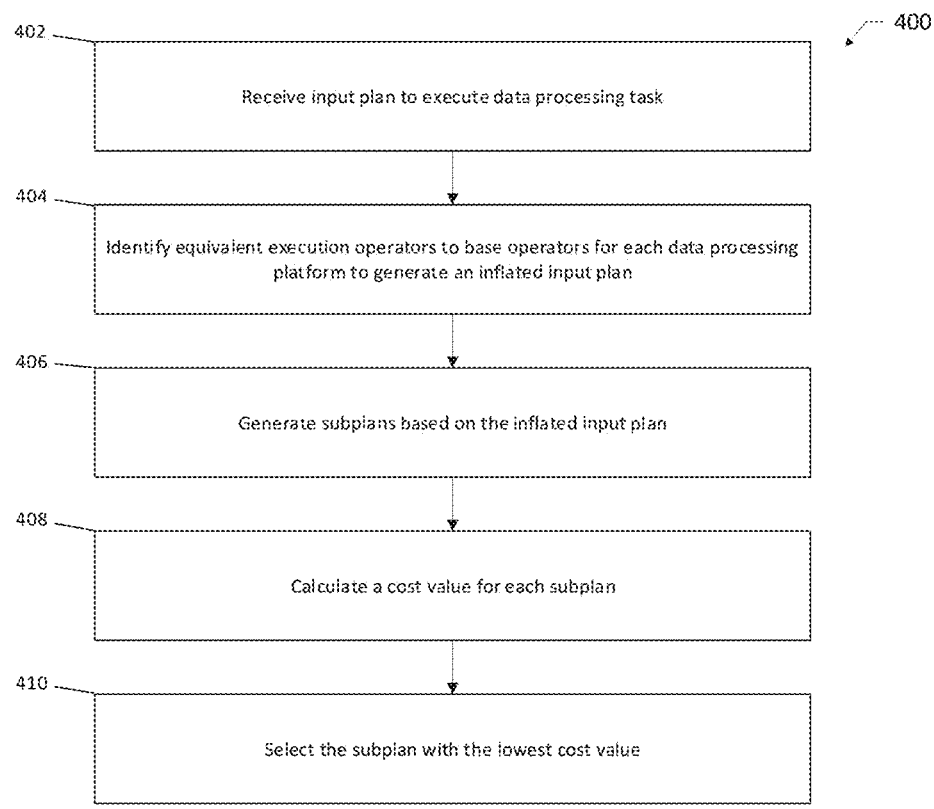
FIG. 4 illustrates an example embodiment of a method for processing data across multiple platforms of the present disclosure.

FIG. 4 illustrates an example embodiment of a method 400 of the present disclosure for processing data across multiple platforms. The method 400 may be implemented on a computer system, such as the data processing system 104. For example, the method 400 may be implemented by the input plan module 110, the platform module 120, the execution operator generator 130, the inflated plan generator 140, the subplan generator 150, and/or the execution plan selector 160. The method 400 may also be implemented by a set of instruction stored on a computer readable medium that, when executed by a processor, cause the computer system to perform the method 400. For example, all or part of the method 400 may be implemented by the CPU 106 and the memory 108. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

In various embodiments, the example data processing system 104 first receives an input plan 102 to execute a data processing task from an application (step 402). The input plan 102 may include a sequence of any number of base operators 112, 114, 116. In various embodiments, the base operators 112, 114, 116 define a particular kind of data transformation over their input and are not specific to any platform. For example, a "Reduce" operator aggregates all input data into a single output. In various embodiments, the example data processing system 104 then identifies (e.g., maps) equivalent execution operators 122, 124 corresponding to each base operator 112, 114, 116 for each platform 122, 124 (step 404). For example, for the base operator 112, the example data processing system 104 may identify the execution operator 132 for the platform 122 and the execution operator 134 for the platform 124.

In some embodiments, while the base operators 112, 114, 116 declare certain data processing operations, they do not provide an implementation and thus are not executable. Thus, in such embodiments, the data processing system 104 inflates the input plan 102 with corresponding execution operators 132, 134 for each platform 122, 124, each execution operator 132, 134 providing an actual implementation on its specific corresponding platform 122, 124. In some embodiments, a mapping dictionary may be used for 1-to-1 operator mappings between base operators 112, 114, 116 and execution operators 132, 134. For example, a platform 122, 124 may have an equivalent operator to a base operator 112, 114, 116 such that a single base operator 112, 114, 116 corresponds to a single execution operator 132, 134.

In some embodiments, however, a single base operator 112, 114, 116 corresponds to more than one execution operator 132, 134 and more complex mappings are required. For example, while databases employ relational operators and Hadoop-like systems build upon "Map" and "Reduce," special purpose systems (e.g., graph processing systems) rather provide specialized operators (e.g., for the "PageRank" algorithm). Thus, it should be appreciated that an execution operator 132, 134 may be a single operator or may be any number of operators that correspond to a single base operator 112, 114, 116. Accordingly, in some embodiments step 404 requires operator mappings, or graph mappings, which map a subgraph corresponding to an input plan 102 to a substitute subgraph including execution operators 132, 134 corresponding to each base operator 112, 114, 116 in the input plan 102. In some embodiments, as used herein, an operator mapping p s may be defined as consisting of the graph pattern p and the substitution function s. Assuming that p matches the subgraph G of a given input plan 102, then the graph mapping designates the substitute subgraph G':=s(G) for this match via the substitution function. In some embodiments, the matched subgraph G is a constellation of base operators 112, 114, 116 and the substitute subgraph G' is a corresponding constellation of execution operators 132, 134 (e.g., "1-to-n mapping"). However, in other embodiments, G may include execution operators 132, 134 and G' may be a constellation of base operators 112, 114, 116 (e.g., "n-to-1 mapping"). The latter cases allow the data processing system 104 to be able to choose among platforms 122, 124 that do not natively support certain base operators 112, 114, 116.

Figure 5A:
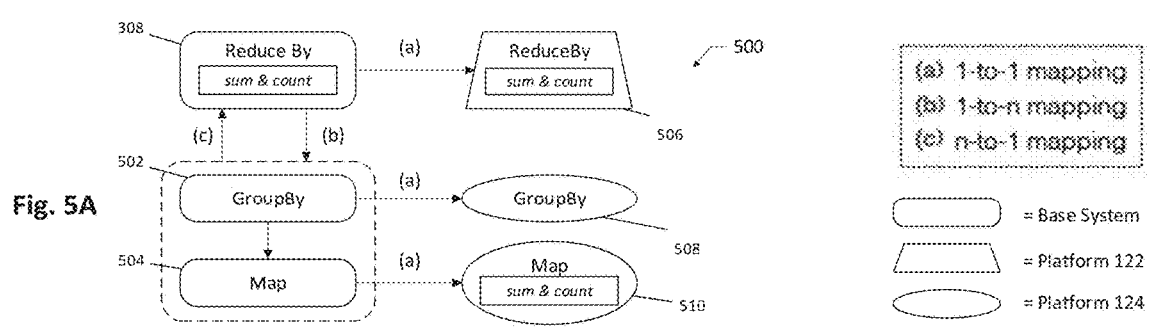
FIG. 5A illustrates an example embodiment of mapping a base operator to execution operators on different platforms of the present disclosure.

FIG. 5A illustrates an example embodiment of a graph mapping 500 of the base operator 308 to the execution operators 506-510. In the example graph mapping 500, base operator 308 is 1-to-1 mapped to the execution operator 506 corresponding to the platform 122. In the example embodiment, however, the platform 124 does not have an equivalent operator to the base operator 308. Thus, the base operator 308 is 1-to-n mapped for the platform 124 which transforms the base operator 308 to a constellation of base operators 502 and 504, which are then transformed (e.g., 1-to-1 mapped) to the execution operators 508 and 510 specific to the platform 124. It should be appreciated that the execution operators 508 and 510 may also be referred to as a single execution operator 132, 134.

Figure 5B:
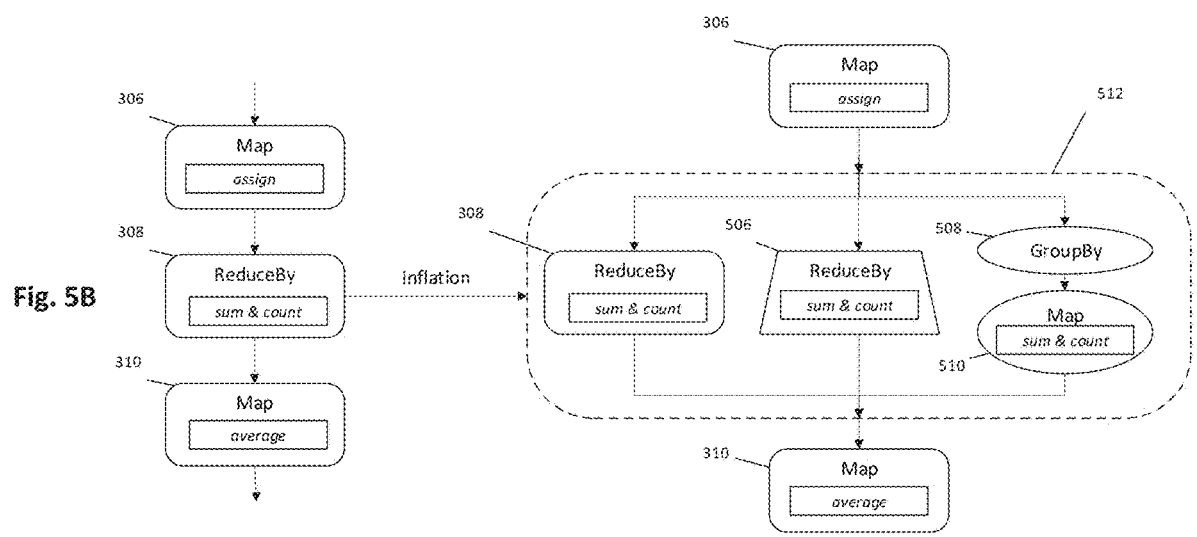
FIG. 5B illustrates an example embodiment of an inflated operator replacing a base operator of the present disclosure.

In various embodiments, after all execution operators 132, 134 are identified for a given base operator 112, 114, 116, the given base operator 112, 114, 116 is replaced by an inflated operator 144, 146, 148, which includes the given base operator 12, 114, 116 and each identified execution operator 132, 134. FIG. 5B illustrates a portion of the input plan 300 and an example inflated operator 512 for the base operator 308 that includes the base operator 308, the execution operator 506 for the platform 122, and the execution operators 508 and 510 for the platform 124. As discussed above, the inflated operator 512 may take the place of the base operator 308 as illustrated, according to an embodiment. It should be appreciated that, in the illustrated embodiment, either execution operator 506 or execution operators 508 and 510 will be included in the final execution plan 180, but not both, which will be discussed in more detail below. In various embodiments, an inflated operator 144, 146, 148 is generated for each of the base operators 112, 114, 116 in the input plan 102 to create an inflated input plan 142. In other words, an inflated input plan 144 includes a sequence of any number of inflated operators 144, 146, 148. An inflated input plan 144 may define all possible combinations of execution operators 132, 134 to enact the input plan 102.

Figure 6:
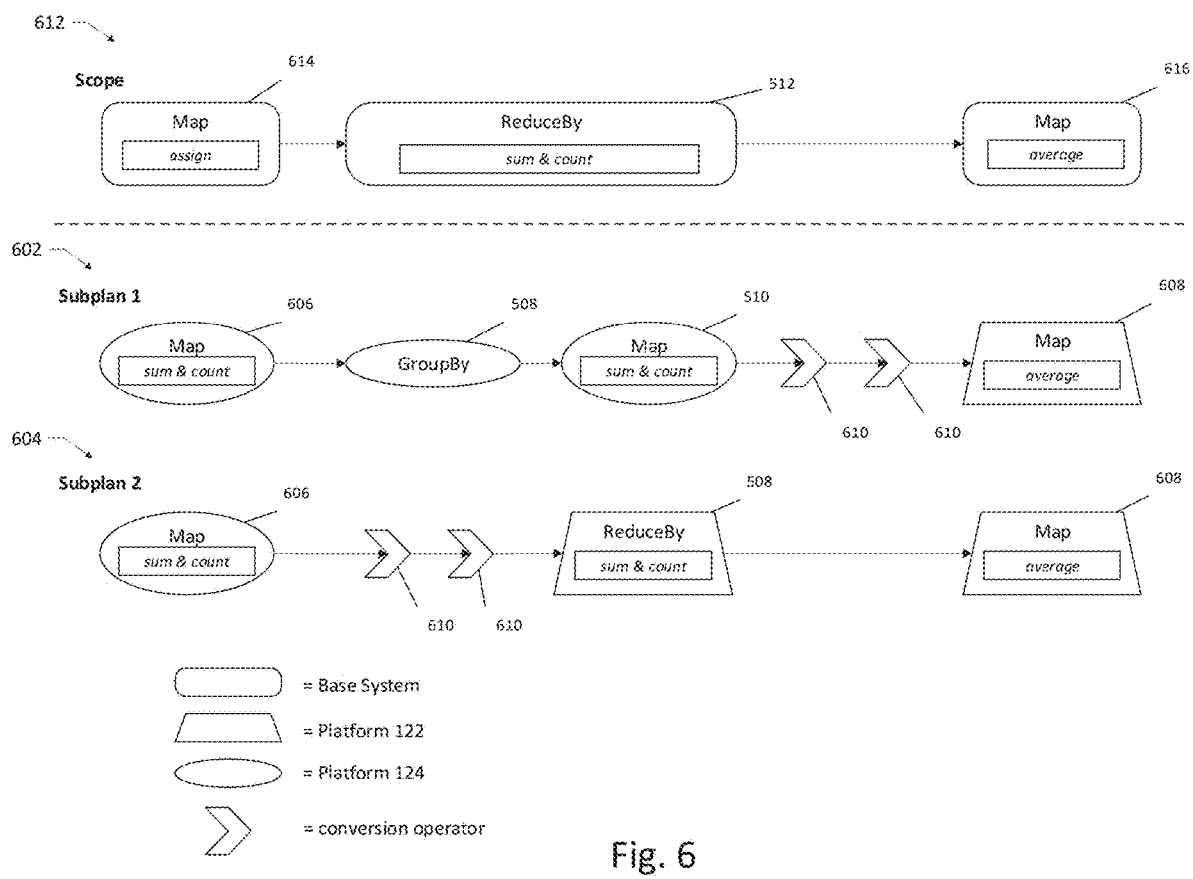
FIG. 6 illustrates an example embodiment of subplans generated from inflated operators of the present disclosure.

In various embodiments, once an inflated input plan 142 is generated, the method 400 (FIG. 4) may include generating a subplan 152, 154 for every possible combination of execution operators 132, 134 that will execute the input plan 102 (step 406). FIG. 6 illustrates an example inflated input plan 612 corresponding to the same portion of the input plan 300 as FIG. 5B. The example inflated input plan 612 includes the inflated operators 614, 512, and 616. FIG. 6 also illustrates example subplans 602 and 604 generated from the example inflated input plan 612. In both of the example subplans 602 and 604, the inflated operator 614 is executed by the example execution operator 606 on the platform 124 and the inflated operator 616 is executed by the example execution operator 608 on the platform 122. As was discussed above, the example inflated operator 512 may be executed by the execution operators 508 and 510 on the platform 124 or by the execution operator 506 on the platform 122. Accordingly, in the example subplan 602 the inflated operator 512 is executed by the execution operators 508 and 510 on the platform 124, and in the example subplan 604 the inflated operator 512 is executed by the execution operator 506 on platform 122. In order for the data to flow between the execution operators 132, 134 on different platforms (e.g., the platforms 122 and the platform 124), conversion operators 610 are provided. For example, conversion operators 610 are provided between the execution operator 510 on the platform 124 and the execution operator 608 on the platform 122. It should be appreciated that conversion operators 610 may be any suitable operator for converting data between platforms.

It should also be appreciated that the example subplans 602 and 604 do not include all of the inflated operators 144, 146, 148 of the example input plan 300 and are merely for illustrating how subplans 152, 154 are generated. In other words, the example subplans 602 and 604 only cover how to execute base operators 306-310 in the example input plan 300. As such, a complete inflated input plan of the example input plan 300 would have more than the two example subplans 602 and 604. For example, as with the inflated operator 512, the inflated operators 614 and 616 may have an additional equivalent execution operator 132, 134 on the platform 122 and the platform 124, respectively, in some embodiments. In such embodiments, there would be additional subplans 152, 154 to cover all possible combinations of the execution operators 132, 134. Further in example, the base operators 302, 304, and 312-316 in the example input plan 300 may also have an inflated operator (e.g., multiple equivalent execution operators 132, 134 on the platforms 122 and 124), and thus additional subplans 152, 154 still would be generated to accommodate all possible combinations of execution operators 132, 134 for executing the input plan 102. It should also be appreciated that in other embodiments, there are more than two available platforms 122, 124 and thus each base operator 112, 114, 116 would have more than two possible execution operators 132, 134. Additional subplans 152, 154 would be generated to accommodate every possible combination of execution operators 132, 134 for executing the input plan 102 across the available platforms 122, 124.

In various embodiments, the example method 400 (FIG. 4) may then include calculating a cost value 172, 174 for each subplan 152, 154 (step 408). In some embodiments, calculating a cost value 172, 174 for a subplan 152, 154 includes calculating an operator cost for each execution operator 132, 134 in a subplan 152, 154 and calculating a data movement cost for moving data across platforms 122, 124 in a subplan 152, 154. It should be appreciated that operator costs for each execution operator 132, 134 may be calculated prior to subplans 152, 154 being generated. For example, an operator cost may be calculated for an execution operator 132, 134 immediately after the execution operator 132, 134 is identified for a platform 122, 124, according to an embodiment.

In some embodiments, an operator cost for an execution operator 132, 134 may include the expected execution time or monetary costs for the execution operator 132, 134. It should be appreciated, however, that any suitable method of determining a cost for utilizing an execution operator 132, 134 of a platform 122, 124 may be used (e.g., time, money, processing power, processing speed). In some embodiments, users can provide hints to the data processing system 104 whenever an execution cost is obvious to improve the execution cost calculations for the data processing system 104. In some embodiments, execution costs can be learned and refined by the data processing system 104 from historical execution data. In other embodiments, the data processing system 104 may employ progressive optimization to make execution cost calculations.

Calculating a data movement cost of a subplan 152, 154 poses a number of challenges. First, in some embodiments, data movement can be complex in that it might involve several intermediate steps to connect a base operator 112, 114, 116 to multiple execution operators 132, 134. Second, there might be several alternative data movement strategies in various embodiments, which requires determining the optimal one. Third, the data movement cost of each data movement strategy must be assessed in various embodiments so that the data processing system 104 can analyze the trade-offs between selecting the optimal execution operators 132, 134 based on operator costs and minimizing data movement costs.

In various embodiments, the present technology provides for representing the space of all possible data movement steps as a channel conversion graph. In some embodiments, the data processing system 104 provides the channel conversion graph to find the most efficient communication path among execution operators 132, 134 using an algorithm. In some embodiments, the channel conversion graph provided by the data processing system 104 may be extended (e.g., when adding a new platform 122, 124 to the data processing system 104).

Figure 7:
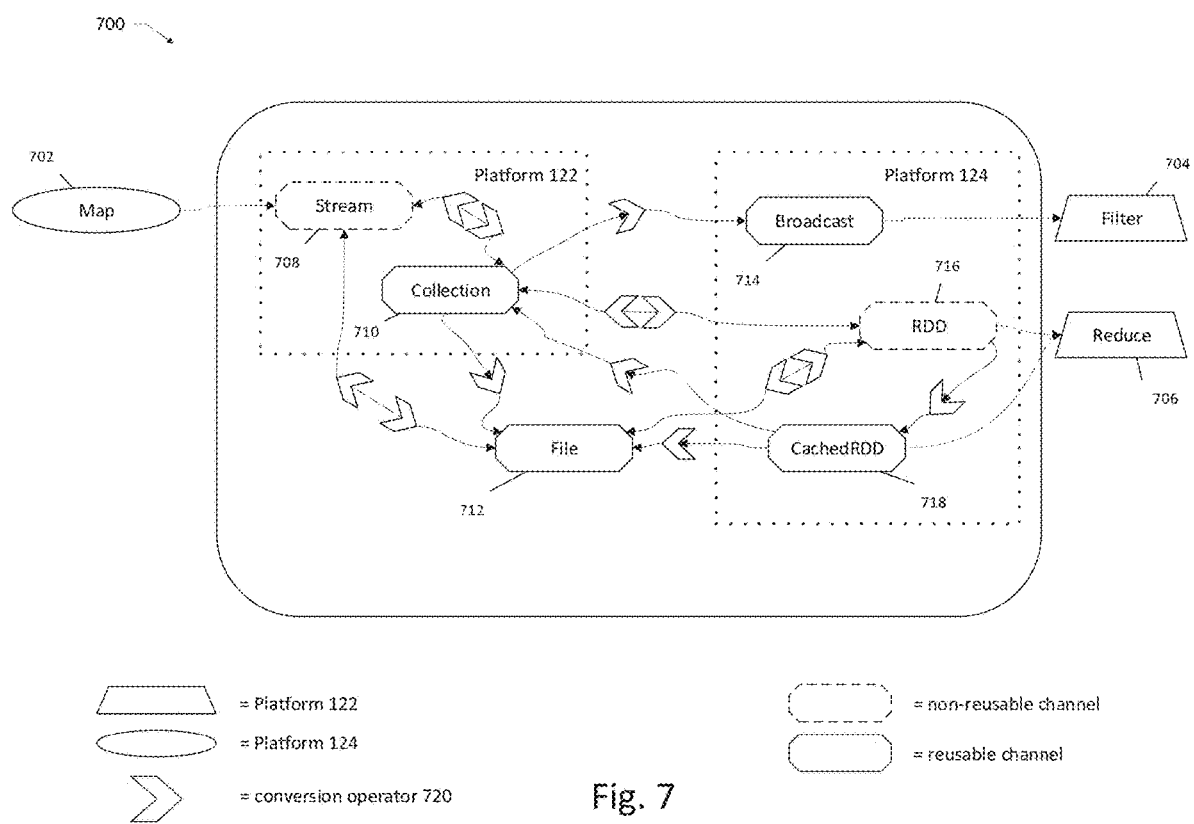
FIG. 7 illustrates an example embodiment of a channel conversion graph for moving data between execution operators of different platforms of the present disclosure.
Figures 10A, 10B:
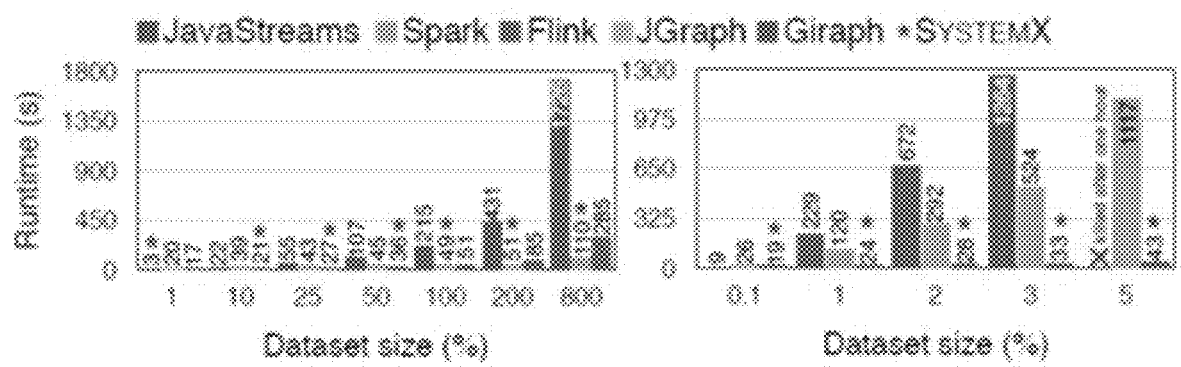
Figures 10C, 10D:
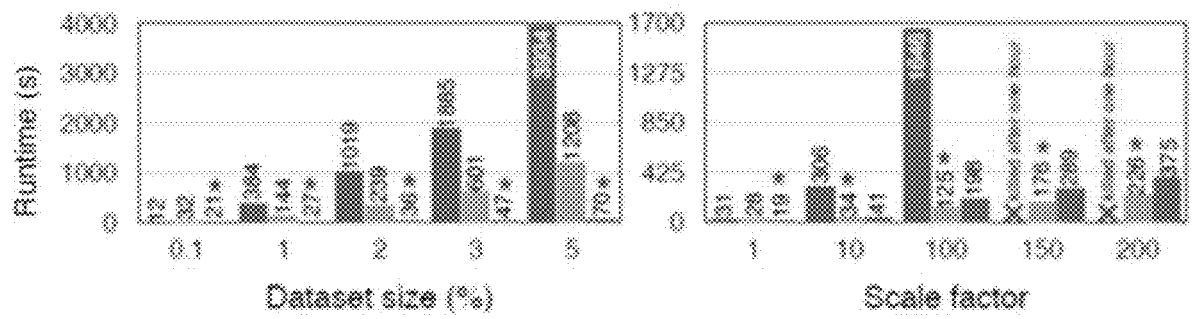

FIG. 7 illustrates an example channel conversion graph 700 to move data from the example execution operator 702 on the platform 124 to the example execution operators 704 and 706 on the platform 122. It should be understood that data can flow among execution operators 132, 134 via communication channels (or simply channels), which form the vertices in the channel conversion graph. Channels, for example, may be an internal data structure or stream within a platform 122, 124, or simply a file. For example, the channels 708-718 depict the standard communication channels considered by the data processing system 104 for the Java Streams and Spark platforms. It should also be understood that channels can be reusable (i.e., they can be consumed multiple times), or non-reusable (i.e., once they are consumed they cannot be used anymore). For instance, a file is reusable, while a data stream is usually not. For illustrative purposes in FIG. 7, the reusable channels 710-714, and 718 are depicted with solid lines and the non-reusable channels 708 and 716 are depicted with dashed lines.

It should also be understood that in some embodiments, it is necessary to convert channels from one type to another. For example, in the illustrated embodiment, it might be necessary to convert a Resilient Distributed Dataset (RDD) channel 716 in the platform 124 to a file channel 712. In various embodiments, converting channels from one type to another is performed by conversion operators, which form the edges in the channel conversion graph. For instance, example conversion operators 720 are depicted as hollow chevron arrows in the example channel conversion graph 700. In various embodiments, conversion operators are execution operators 132, 134. For example, the data processing system 104 may provide the SparkRDDToFile operator in an embodiment, which reads the RDD in the Spark platform and writes it to a file. Because the data movement costs are incurred not by either channel in a conversion, but by the conversion operator, the data processing system 104 may compute conversion costs as operator costs. In some embodiments, and as used herein, a channel conversion graph is a directed graph $G:=(C, E, \lambda)$, where the set of vertices C contains the channels, E comprises the directed edges indicating that the source channel can be converted to the target channel, and $\lambda: E \rightarrow O$ is a labeling function that attaches the appropriate conversion operator $o \in O$ to each edge $e \in E$.

Channel conversion graphs allow the example data processing system 104 to model the data movement problem as a graph problem, which is a very flexible approach. For example, modeling the data movement problem as a graph problem provides for identifying any and every way to connect the execution operators 132, 134 via a sequence of conversion operators, according to an embodiment. In various embodiments, the data processing system 104 models the possible scenarios for finding the most efficient communication path from a root operator to a target operator (e.g., from the example execution operator 702 to the example execution operators 704 and 706) as a minimum conversion tree (MCT) problem. For example, given a root channel $c_r$, n target channel sets $C_{ti}$ ($0 < i \leq n$), and the channel conversion graph $G=(C, E, \lambda)$, find a subgraph G' (i.e., a minimum conversion tree), such that: (1) G' is a directed tree with root $c_r$ and contains at least one channel $c_{ti}$ for each target channel set $C_{ti}$, where $c_{ti} \in C_{ti}$; (2) any non-reusable channel in G' must have a single successor (i.e., a conversion or a consumer operator); (3) the sum of costs of all edges in G' is minimized, i.e., there is no other subgraph G' that satisfies the above two conditions and has a smaller cost than G'. The cost of an edge e is the estimated cost for the associated conversion operator A(e).

Returning to the example channel conversion graph 700 in FIG. 7, the root channel (e.g., channel 708) is $c_r:=$Stream and the target channel sets are $C_{t1}:=$Broadcast (e.g., channel 714) and $Ct_2:=$RDD, CachedRDD (e.g., channels 716 and 718). According to an embodiment, an example minimum conversion tree for the example channel conversion graph 700 could look as follows: The Stream root channel 708 may be converted to a Java Collection (e.g., the channel 710). This Collection (e.g., the channel 710) may then be converted twice; namely to a Spark Broadcast channel 714 (thereby satisfying $Ct_1$) and to an RDD channel 716 (thereby satisfying $Ct_2$). It should be understood that this example communication path is possible only because the Collection channel 710 is reusable.

It should be appreciated that in various embodiments a minimum cost tree may have a fixed root channel and need not span the whole channel conversion graph. It should also be appreciated that in various embodiments, the present disclosure seeks to minimize the costs of the conversion tree as a whole rather than its individual paths from the root to the target channels. For example, the overall costs for a minimum conversion tree are not determined by the most expensive conversion path but by the sum of the costs of all conversions, according to an embodiment. It should further be understood that the present disclosure, in various embodiments, does not allow for parallel execution of conversion operators.

In various embodiments, the present technology provides for an algorithm 800 to solve a minimum conversion tree problem, as illustrated in FIG. 8, with Lines 1-20 of the algorithm indicated. Given a channel conversion graph G, a root channel $c_r$, and n target channel sets $\mathcal{C}_t := \{C_{t1}, C_{t2}, \ldots, C_{tn}\}$, the algorithm 800 proceeds in two principal steps. First, the algorithm 800 simplifies the problem by modifying the input parameters (kernelization, Line 1). Then, the algorithm 800 explores the graph (channel conversion graph exploration, Line 2) to find the minimum conversion tree (Line 3). The kernelization and channel conversion graph exploration functions will be described in more detail below.

The kernelization function of the provided algorithm 800 will be discussed first. In the frequent case that two (or more) target operators target, and target, accept the same communication channels, i.e., $C_{ti} = C_{tj}$, with at most one non-reusable channel and at least one reusable channel, the present technology may provide for merging them into a single set by discarding the non-reusable channel: $C_{ti,j} = \{c | c \in C_{ti} \hat{ } c$ is reusable$\}$. For example, with reference to FIG. 7, the execution operator 706 accepts the channels 716 and 718, but if it is assumed there is a third target operator in addition to the execution operators 704 and 706 that accepts the same set of channels as the execution operator 704, then the input channels could be merged for the additional execution operator and the execution operator 704. The key point of this kernelization of the algorithm 800 is that it decreases the number of target channel sets and thus, reduces the maximum degree (i.e., fanout) of the MCT, which is a major complexity driver of the MCT problem. For example, in the case of only a single target channel set, the MCT problem becomes a single-source single-destination shortest path problem, which can be solved with, e.g., Dijkstra's algorithm.

After the MCT problem has been kernelized, the algorithm 800 proceeds to explore the channel conversion graph. For example, the algorithm 800 searches—starting from the root channel $c_r$—across the channel conversion graph for communication channels that satisfy the target channel sets $C_t$. The algorithm 800 then backtracks the search paths, thereby incrementally building up the MCT. Concretely, the traverse function implements this strategy via recursion—in other words, each call of this function represents a recursive traversal step through the channel conversion graph. The objective of each such step is to build up a dictionary T (Line 5) that associates subsets of the target channel sets, i.e., $C_s \subseteq C_t$, with partial conversion trees (PCTs) from the currently visited channel to those target channels $C_s$. While backtracking from the recursion, these PCTs can then be merged successively until they form the final MCT.

For illustrative purposes, the algorithm 800 may be applied to the MCT problem in FIG. 7, i.e., $c_r$:=Stream, $C_{t1}$:=Broadcast, and $C_{t2}$:=RDD, CachedRDD. It can also be assumed that one recursion step has already been made from the Stream channel 708 to the Collection channel 710. That is, in the present invocation of traverse c:=Collection is visited, and on the current path only $C_V = \{$Stream$\}$ has been visited and did not reach any target channel sets, i.e., Cs:=Ø. The traverse function (Line 4) starts by collecting all so far unsatisfied target channel sets $\mathcal{C}_s'$ that are satisfied by the currently visited channel c (Line 6). If there is any such target channel set (Line 7), a PCT is created for any combinations of those target channel sets in $\mathcal{C}_s'$ (Line 8). At this point, these PCTs consist only of c as root note, but will be "grown" during backtracking form the recursion. If all target channel sets have been satisfied on the current traversal path, backtracking can immediately begin (Line 9). In the current example, c=Stream does not satisfy any target channel set, i.e., $\mathcal{C}_s' = \emptyset$, and backtracking cannot yet begin.

In the second phase of the algorithm 800, the traverse function does the forward traversal. Accordingly, the traverse function marks the currently visited channel c as visited; and if c is reusable and satisfies some target channel sets $\mathcal{C}_s'$, it marks those sets also as satisfied (Lines 10-11). This allows the recursion to eventually terminate. Next, the algorithm 800 traverses forward by following all channel conversion graph edges starting at c and leading to an unvisited channel (Lines 13-14). Accordingly, in the present example, the Broadcast channel 714, the RDD channel 716, and the File channel 712 are visited. Each recursive call yields another dictionary T' of PCTs. For example, when invoking the traverse function on the Broadcast channel 714, $T'[C_{t1}]$=Broadcast (a PCT consisting only of Broadcast as root). At this point, the followed edge is added to this PCT to "grow" it (Line 16) and obtain the PCT Collection→Broadcast. All "grown" PCTs are stored in $\mathcal{T}$.

It should be understood that none of the PCT's in $\mathcal{T}$ might have reached all target channel sets. For example, the above mentioned PCT Collection→Broadcast is the only one to satisfy $C_{t1}$, but it does not satisfy $C_{t2}$. Therefore, the third and final phase of the traverse function of the algorithm 800 merges certain PCTs in $\mathcal{T}$. Specifically, the disjoint-combinations function (Line 18) enumerates all combinations of PCTs in $\mathcal{T}$ that (i) originate from different recursive calls of traverse; (ii) do not overlap in their satisfied target channel sets; and (iii) consist of 1 to d different PCTs. While the former two criteria ensure that all combinations of PCTs are enumerated that may be merged, the third criterion helps to avoid enumerating futile combinations. For example, when the current channel c is not reusable, it must not have multiple consuming conversion operators, so d is set to 1 (Line 17). In any other case, any PCT must not have a degree larger than the number of not satisfied target channels sets; otherwise the enumerated PCTs would overlap in their satisfied target channel sets. It should be appreciated that the value of d can be lowered by kernelization, which reduces the number of target channel sets.

In the present example, there are three outgoing conversion edges from c=Collection but only two non-satisfied target channel sets, namely $C_{t1}$ and $C_{t2}$. As a result, merging PCTs from all three edges simultaneously can be avoided, as the resulting PCT could not be minimal. Eventually, the merge-and-update function combines the PCTs into a new PCT and, if there is no PCT in T already that reaches the same target channel sets and has lower costs, the new PCT is added to T (Line 19). Amongst others, the PCTs Collection Broadcast and Collection RDD are merged in the present example. When backtrack is performed (Line 20), the resulting PCT will be "grown" by the edge Stream→Collection and form the eventual MCT.

It should be appreciated that the algorithm 800 solves the MCT problem exactly. If, however, the algorithm 800 runs into performance problems given the amount of data, the algorithm 800 may be made approximate in some embodiments. For example, in embodiments where there are a very large number of possible execution operators 132, 134 and a very large number of channels between the execution operators 132, 134. The present technology may use the above described channel conversion graphs and the algorithm 800 in calculating the data movement costs of a subplan 152, 154, according to an embodiment.

Returning to FIG. 4, in various embodiments, the example method 400 then includes selecting the subplan 152, 154 with the lowest cost value 172, 174 (step 410). In various embodiments, selecting the subplan 152, 154, with the lowest cost value 172, 174 includes enumerating the possible subplans 152, 154 which utilizes an algorithm 900 illustrated in FIG. 9, with Lines 1-11 of the algorithm indicated. The subplan 152, 154 enumeration search space is defined along with traversal operations algebraically. The enumeration algebra needs only one principal data structure, the enumeration E=(S, SP), which comprises a set of execution subplans SP for a given scope S. While the scope is the set of inflated operators 144, 146, 148 that an enumeration is considering, the subplans 152, 154 select the execution operators 132, 134 for each inflated operator 144, 146, 148 in S, including execution operators 132, 134 for the data movement. An enumeration may be thought of as a relational table whose schema corresponds to its scope and whose tuples correspond to its possible execution subplans 152, 154. The goal is to efficiently identify a subplan 152, 154 $sp_k \in SP$ such that $cost(sp_k) \leq cost(sp_i)$ $\forall sp_i \in SP$, where $cost(sp_i)$ comprises the costs of execution, data movement, and platform initializations of $sp_i$.

In an embodiment, the enumeration algebra comprises two main operations, Join (1<) and Prune (σ), both of which allow to manipulate enumerations. For example, Join connects two small enumerations to form a larger one, while Prune scraps inferior subplans 152, 154 from an enumeration for efficiency reasons. The Join operation may be defined as follows. Given two disjoint enumerations $E_1=(S_1, SP_1)$ and $E_2=(S_2, SP_2)$ (i.e., $S_1 \cap S_2=$), a join $E_1 1<E_2=(S, SP)$ is defined where $S:=S_1S_2$ and $SP:=\{connect(sp_1, sp_2) | sp1 \in SP_1$ can be connected to $sp_2 \in SP_2\}$. The connect function connects $sp_1$ and $sp_2$ by adding conversion operators between operators of the two subplans 152, 154. The Prune operation may be defined as follows. Given an enumeration E=(S, SP), a pruned enumeration $\sigma_\pi(E):=(S, SP)$ is defined where $SP':=\{sp \in SP | sp$ satisfies $\pi\}$ and $\pi$ is a configurable pruning criterion.

As stated above, in various embodiments, an algorithm 900 may be utilized to enumerate the possible subplans 152, 154 and select the subplan 152, 154 with the lowest cost value 172, 174. The presently disclosed algorithm 900 provides for lossless pruning. For example, given an inflated input plan 142, a singleton enumeration is created for each inflated operator 144, 146, 148 (Line 1). The enumerations are then repeatedly joined and pruned to obtain the optimal execution plan 180 (e.g., the subplan 152, 154 with the lowest cost value 172, 174), and pruning effectiveness is maximized by choosing a good order to join the enumerations. Thus, join groups are first identified (Line 2). A join group indicates a set of plan enumerations to be joined. Initially, a join group is created for the output of each inflated operator 144, 146, 148, so that each join group contains (i) the enumeration for the operator with that output, $E_{out}$, and (ii) the enumerations for all inflated operators 144, 146, 148 that consume that output as input, $E_{in}^i$. For example, in the inflated plan of the example input plan 300 in FIG. 3, the enumerations for Map ("assign") and ReduceBy ("sum & count") form an initial join group.

While the join order is not relevant to the correctness of the enumeration algorithm, joining only adjacent enumerations may be beneficial to performance. For example, it minimizes the number of boundary operators in the resulting enumeration, which in turn may make the lossless pruning most effective. To further promote this effect, the join groups may be ordered ascending by the number of boundary operators (Line 3). Then, the join groups are greedily polled from the queue, the corresponding join is executed, and the join product is pruned (Lines 4-6). Also, in any other join group that includes one of the joined enumerations (i.e., $E_{out}$ or any $E_{in}^i$) those joined enumerations need to be replaced with the join product $E_\infty$ (Lines 7-9). These changes make it necessary to reorder the affected join products in the priority queue (Line 10). Eventually, the last join product is a full enumeration for the complete input plan 102. Its subplan 152, 154 with the lowest cost value 172, 174 is the optimal execution plan 180 (Line 11).

It should be appreciated that the algorithms and algebra disclosed herein are merely an embodiment of the presently disclosed technology for calculating cost values 172, 174 and selecting a subplan 152, 154 with the lowest cost value 172, 174. Other suitable algorithms and algebra may be utilized with the presently disclosed technology to generate subplans 152, 154 for executing an input plan 102 and to calculate cost values 172, 174.

The presently disclosed technology was implemented in the open-source cross-platform system SystemX. All experiments were ran on a cluster of 10 machines. Each node had one 2 GHz Quad Core Xeon processor, 32 GB main memory, 500 GB SATA hard disks, a 1 Gigabit network card and runs 64-bit platform Linux Ubuntu 14.04.05.

The following platforms were considered: Java's Stream library (JavaStreams), PostgreSQL 9.6.2 (PSQL), Spark 1.6.0 (Spark), Flink 1.3.2 (Flink), GraphX 1.6.0 (GraphX), Giraph 1.2.0 (Giraph), a simple self-written Java graph library (JGraph), and HDFS 2.6.0 to store files. All systems were used with their default settings and the RAM of each platform was configured to 20 GB.

A broad range of data analytics tasks from different areas were considered, namely text mining (TM), relational analytics (RA), machine learning (ML), and graph mining (GM). Details on the datasets and tasks are shown in Table 1 below. These tasks and datasets individually highlight different features of presently disclosed cost-based optimizer and together demonstrate its general applicability. Note that, to allow the optimizer to choose most of the available platforms, all tasks' input datasets (with the exception of Polystore's) are stored on HDFS (except when specified otherwise). To challenge the optimizer and evaluate its effectiveness, the focus was primarily on medium-sized datasets, so that all platforms are competitive performance-wise. Nonetheless, the presently disclosed optimizer scales to large datasets when provided with scalable processing platforms. Note that all the numbers were the average of three runs.

TABLE 1

| Task | Description | Dataset | Default store |
| --- | --- | --- | --- |
| WordCount (TM) | count distinct words | Wikipedia abstracts (3 GB) | HDFS |
| Word2NVec (TM) | word neighborhood vectors | Wikipedia abstracts (3 GB) | HDFS |
| SimWords (TM) | word neighborhood clustering | Wikipedia abstracts (3 GB) | HDFS |
| Aggregate (RA) | aggregate query (TPC-H Q1) | TPC-H (1-100 GB) | HDFS |
| Join (RA) | 2-way join (TPC-H Q3) | TPC-H (1-100 GB) | HDFS |
| PolyJoin (RA) | n-way join (TPC-H Q5) | TPC-H (1-100 GB) | Postgres, HDFS, LFS |
| Kmeans (ML) | clustering | USCensus1990 (361 MB) | HDFS |
| SGD (ML) | stochastic gradient descent | HIGGS (7.4 GB) | HDFS |
| CrocoPR (GM) | cross-community pagerank | DBpedia pagelinks (20 GB) | HDFS |

The first experiment was how well the presently disclosed optimizer selected a single data processing platform to execute a given task. The optimizer was forced to use a single platform when executing a task. Then, it was checked whether the optimizer chose the one with the best runtime. All the tasks of Table 1 were ran with increasing dataset sizes. PolyJoin was not run as it cannot be performed using a single platform. For CrocoPR, K-means, and SGD, the algorithms were looped for 10, 100, and 1,000 times, respectively. To further stress the optimizer, for K-means, its input dataset was increased ten times (i.e., 3.6 GB).

FIG. 10A-10H illustrate the execution times for all the data analytic tasks and for increasing dataset sizes. The results show that the presently disclosed optimizer indeed made robust platform choices whenever runtimes differed substantially. For example, the optimizer prevented running (i) Word2NVec and SimWords on the Spark platform for 5% of its input dataset because it only employs 2 computer nodes and performs worse than the Flink platform which employs all 10 nodes, (ii) SimWords on the Java platform for 1% of its input dataset because JaveStreams slows down the entire process, (iii) WordCount on the Flink platform for 800% of its input dataset because Flink suffers from a slower data reduce mechanism, and (iv) CrocoPR on the JGraph platform for more than 10% of its input dataset because it simply cannot efficiently process large datasets.

The presently disclosed optimizer additionally generally chose the right platform even for the difficult cases where the execution times are quite similar on different platforms. For example, it always selected the right platform for Aggregate and Join even if the execution times for Spark and Flink are quite close to each other. Only in few of these difficult cases did the optimizer fail to choose the best platform, such as in Word2NVec and SimWords for 0.1% of input data. This is because the accuracy of the optimizer is very sensitive to uncertainty factors, such as cost model calibration and cardinality estimates. These factors are also quite challenging to estimate even for controlled settings, such as in databases. Still, despite these two cases, all these results allow us to conclude that the presently disclosed cost-based optimizer chose the best platform for almost all tasks and it prevented tasks from falling into worst execution cases.

The next experiment was in regard to the efficiency of the presently disclosed optimizer when using multiple platforms for a task. FIGS. 11A-11D illustrate the results which demonstrated that the optimizer matched the performance of any single platform execution, but in several cases considerably improved over single-platform executions. The presently disclosed optimizer was up to 20× faster than the Spark platform, up to 17× faster than the Flink platform, up to 21× faster than the JavaStreams platform, and up to 6× faster than the Giraph platform. For example, for CrocoPR, the presently disclosed optimizer uses a combination of Flink and JGraph, even if Giraph is the fastest baseline platform. This was because after the preparation phase of this task, the input dataset for the PageRank operation on JGraph is a couple of megabytes only. Ad-ditionally, for WordCount, the optimizer detected that moving the result data from Spark to JavaStreams and afterwards shipping it to the driver application was slightly faster than Spark (which is the fastest baseline platform for this task). This was because when moving data to JavaStreams the optimizer used the action Rdd.collect( ), which is more efficient than the operation Spark uses to move data to the driver (Rdd.toLocalIterator( )). Therefore, the results indicate that the optimizer was able to identify hidden opportunities to improve performance as well as to perform much more robustly (than when selecting a single platform) by using multiple platforms.

Figure 12A:
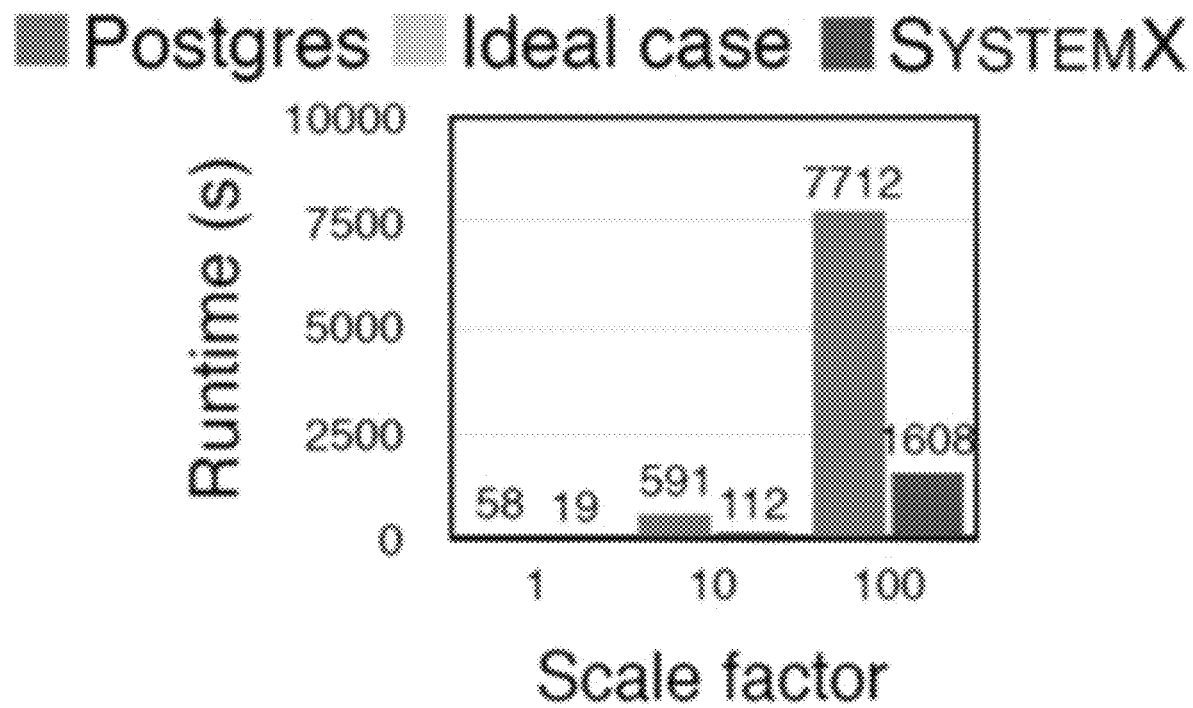
FIG. 12A illustrates an example graphical representation demonstrating the efficiency of the presently disclosed optimizer in polystore settings.

The next experiment was to evaluate the efficiency of the presently disclosed optimizer in polystore settings, where the input datasets are dispersed across several systems. FIG. 12A illustrates the results that demonstrate the presently disclosed optimizer was significantly faster, namely up to 5×, than the current practice. For example, loading data into the Postgres platform was already approximately 3× slower than it takes the optimizer to complete the task. Therefore, the results show that the presently disclosed optimizer has substantial benefits in polystore scenarios, not only in terms of performance but also in terms of ease-of-use, as users do not have to write ad-hoc scripts anymore to integrate different data processing platforms.

Figure 12B:
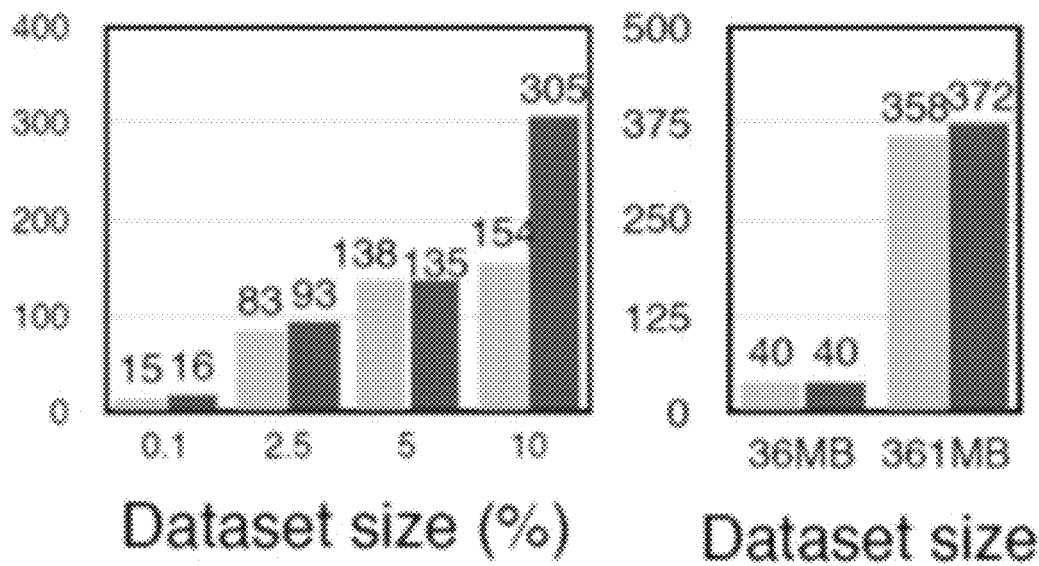
FIG. 12B illustrates example graphical representations demonstrating the effectiveness of the presently disclosed optimizer to complement the functionalities of disparate processing platforms.

The next experiment was to evaluate the effectiveness of the presently disclosed optimizer to complement the functionalities of disparate processing platforms. FIG. 12B illustrates the results that demonstrate that the optimizer achieved similar performance with the ideal case in almost all scenarios. The results show that the presently disclosed optimizer free users from the burden of complementing the functionalities of diverse platforms, without sacrificing performance.

Figure 13A:
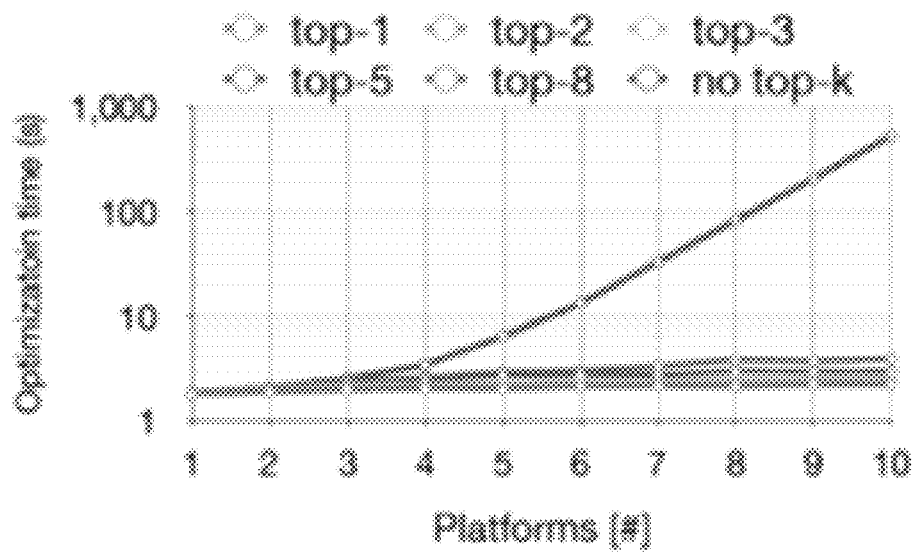
FIG. 13A illustrates an example graphical representation demonstrating the scalability of the presently disclosed optimizer for Kmeans when increasing the number of supported platforms.
Figure 13B:
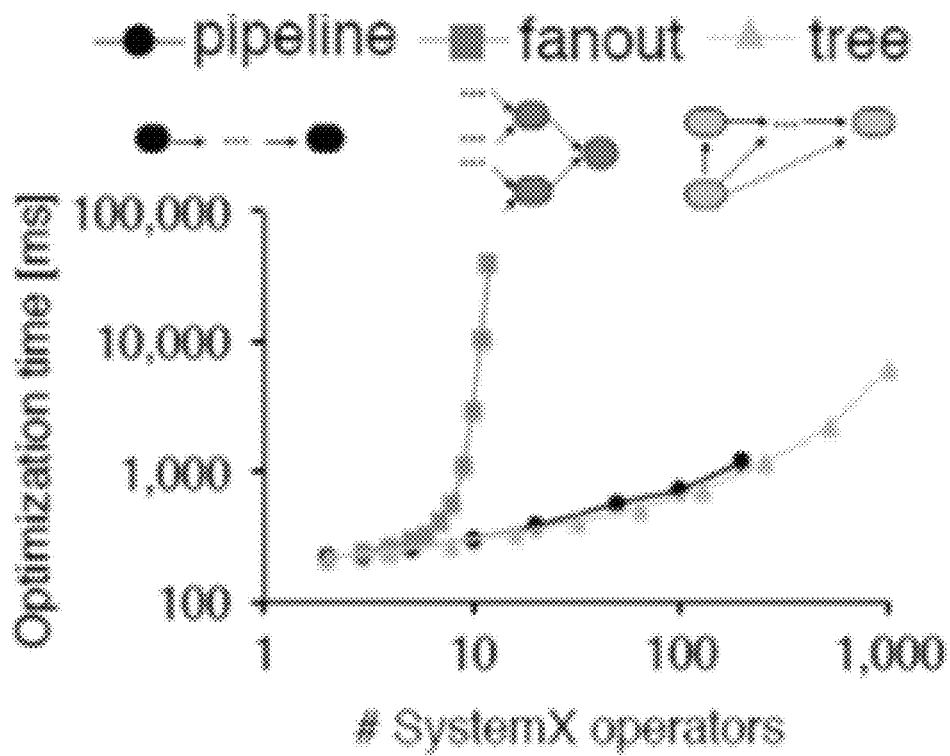
FIG. 13B illustrates an example graphical representation demonstrating the presently disclosed optimizer's scalability with respect to the number of operators in a task.

The next experiment was to evaluate the scalability of the presently disclosed optimizer in order to determine whether it operates efficiently on large SystemX plans and for large numbers of platforms. FIG. 13A illustrates the results of the scalability of the optimizer for Kmeans when increasing the number of supported platforms, and the results for the other tasks were similar. The optimization times increased along with the number of platforms, though the optimizer efficiently scaled with the number of platforms. FIG. 13B illustrates the results for evaluating the optimizer's scalability with respect to the number of operators in a task. The results demonstrate that the presently disclosed optimizer can scale to a realistic number of platforms and to a reasonable number of operators in a SystemX plan.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A cross-platform data processing apparatus comprising:
   a processor; and
   a memory storing instructions which, when executed by the processor, cause the processor to:
   receive an input plan to process a set of data, the input plan comprising a plurality of base operators;
   determine at least one first execution operator for a first base operator from the plurality of base operators, the at least one first execution operator corresponding to a first data processing platform;
   determine at least one second execution operator for the first base operator, the at least one second execution operator corresponding to a second data processing platform;
   generate an inflated operator including the first base operator, each of the determined at least one first execution operator, and each of the determined at least one second execution operator;
   generate a first subplan based on the inflated operator, the first subplan including the first execution operator but not the second execution operator;
   generate a second subplan based on the inflated operator, the second subplan including the second execution operator but not the first execution operator;
   calculate a cost value for each of the first subplan and the second subplan; and
   select the first subplan or the second subplan that has the lowest cost value.

2. The apparatus of claim 1, wherein the memory stores instructions which, when executed by the processor, cause the processor to determine a plurality of execution operators for the first base operator, each of the plurality of execution operators corresponding to a different data processing platform.

3. The apparatus of claim 1, wherein the memory stores instructions which, when executed by the processor, cause the processor to determine a plurality of execution operators for each base operator in a plurality of base operators, each execution operator for each base operator corresponding to a different data processing platform.

4. The apparatus of claim 3, wherein the memory stores instructions which, when executed by the processor, cause the processor to:
   generate a plurality of subplans based on the plurality of execution operators;
   calculate a cost value for each of the plurality of subplans; and
   select the subplan with the lowest cost value.

5. The apparatus of claim 1, wherein the memory stores instructions which, when executed by the processor, cause the processor to generate an inflated operator for each of the plurality of base operators.

6. The apparatus of claim 5, wherein the memory stores instructions which, when executed by the processor, cause the processor to generate an inflated input plan, wherein the inflated input plan comprises a plurality of inflated operators.

7. The apparatus of claim 1, wherein determining the first execution operator and the second execution operator comprises using a mapping dictionary to map the base operator to the first execution operator and the second execution operator.

8. The apparatus of claim 1, wherein determining the first execution operator and the second execution operator comprises graph mapping the base operator to the first execution operator and the second execution operator.

9. The apparatus of claim 1, wherein calculating the cost value of a plan comprises calculating an operating cost and a data movement cost of the plan.

10. The apparatus of claim 9, wherein calculating the data movement cost comprises using a minimum cost conversion tree.

11. A method for efficient cross-platform data processing, the method comprising:
    receiving an input plan to process a set of data, the input plan comprising a plurality of base operators;
    determining at least one first execution operator for a first base operator from the plurality of base operators, the at least one first execution operator corresponding to a first data processing platform;
    determining at least one second execution operator for the first base operator, the at least one second execution operator corresponding to a second data processing platform;
    generating an inflated operator including the first base operator, each of the determined at least one first execution operator, and each of the determined at least one second execution operator;
    generating a first subplan based on the inflated operator, the first subplan including the first execution operator but not the second execution operator;
    generating a second subplan based on the inflated operator, the second subplan including the second execution operator but not the first execution operator;
    calculating a cost value for each of the first subplan and the second subplan; and
    selecting the first subplan or the second subplan with the lowest cost value.

12. The method of claim 11, wherein the method comprises determining a plurality of execution operators for the first base operator, each of the plurality of execution operators corresponding to a different data processing platform.

13. The method of claim 11, wherein the method comprises determining a plurality of execution operators for each base operator in a plurality of base operators, each execution operator for each base operator corresponding to a different data processing platform.

14. The method of claim 13, wherein the method comprises:
    generating a plurality of subplans based on the plurality of execution operators;
    calculating a cost value for each of the plurality of subplans; and
    selecting the subplan with the lowest cost value.

15. The method of claim 11, wherein the method comprises generating an inflated operator for each of the plurality of base operators.

16. The method of claim 15, wherein the method comprises generating an inflated input plan, wherein the inflated input plan comprises a plurality of inflated operators.

17. The method of claim 11, wherein determining the first execution operator and the second execution operator comprises graph mapping the base operator to the first execution operator and the second execution operator.

18. The method of claim 11, wherein calculating the cost value of a plan comprises calculating an operating cost and a data movement cost of the plan.

19. The method of claim 18, wherein calculating the data movement cost comprises using a minimum cost conversion tree.

20. A non-transitory, computer-readable medium storing instructions which, when performed by a processor, cause the processor to:

receive an input plan to process a set of data, the input plan comprising a plurality of base operators;

determine at least one first execution operator for a first base operator from the plurality of base operators, the at least one first execution operator corresponding to a first data processing platform;

determine at least one second execution operator for the first base operator, the at least one second execution operator corresponding to a second data processing platform;

generate an inflated operator including the first base operator, each of the determined at least one first execution operator, and each of the determined at least one second execution operator;

generate a first subplan based on the inflated operator, the first subplan including the first execution operator but not the second execution operator;

generate a second subplan based on the inflated operator, the second subplan including the second execution operator but not the first execution operator;

calculate a cost value for each of the first subplan and the second subplan; and select the first subplan or the second subplan that has the lowest cost value.

21. A cross-platform data processing apparatus comprising:

a processor; and a memory storing instructions which, when executed by the processor, cause the processor to:

receive an input plan to process a set of data, the input plan comprising a plurality of base operators;

determine a first execution operator for a first base operator from the plurality of base operators, the first execution operator corresponding to a first data processing platform;

determine a second execution operator for the first base operator, the second execution operator corresponding to a second data processing platform;

generate an inflated operator for each of the plurality of base operators;

generate a first subplan based on the first execution operator;

generate a second subplan based on the second execution operator;

calculate a cost value for each of the first subplan and the second subplan; and select the first subplan or the second subplan that has the lowest cost value.

22. A cross-platform data processing apparatus comprising:

a processor; and a memory storing instructions which, when executed by the processor, cause the processor to:

receive an input plan to process a set of data, the input plan comprising a plurality of base operators;

determine a first execution operator for a first base operator from the plurality of base operators, the first execution operator corresponding to a first data processing platform;

determine a second execution operator for the first base operator, the second execution operator corresponding to a second data processing platform;

generate a first subplan based on the first execution operator;

generate a second subplan based on the second execution operator;

calculate a cost value for each of the first subplan and the second subplan; and select the first subplan or the second subplan that has the lowest cost value, wherein calculating the cost value for each of the first subplan and the second subplan includes calculating an operating cost and a data movement cost for each of the first subplan and the second subplan, and wherein calculating the data movement cost comprises using a minimum cost conversion tree.

* * * * *